Jan. 6, 1970                E. BELTZUNG                3,487,951
                           DISPLAY STAND
                        Filed June 28, 1968
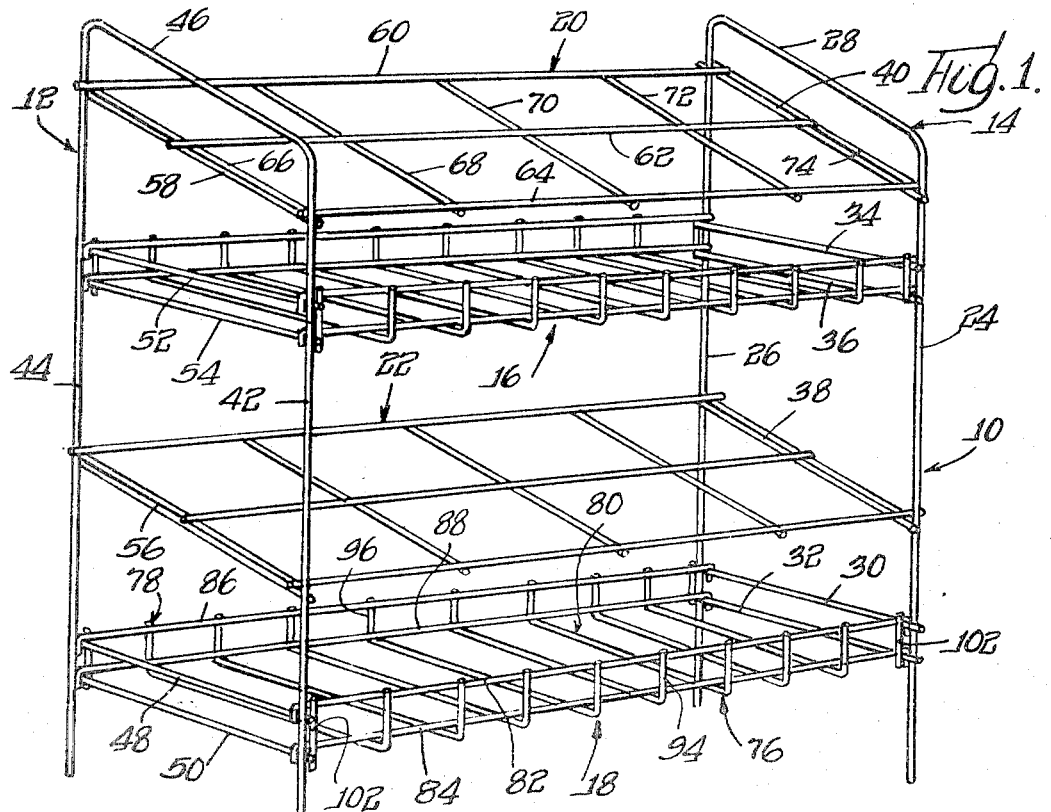
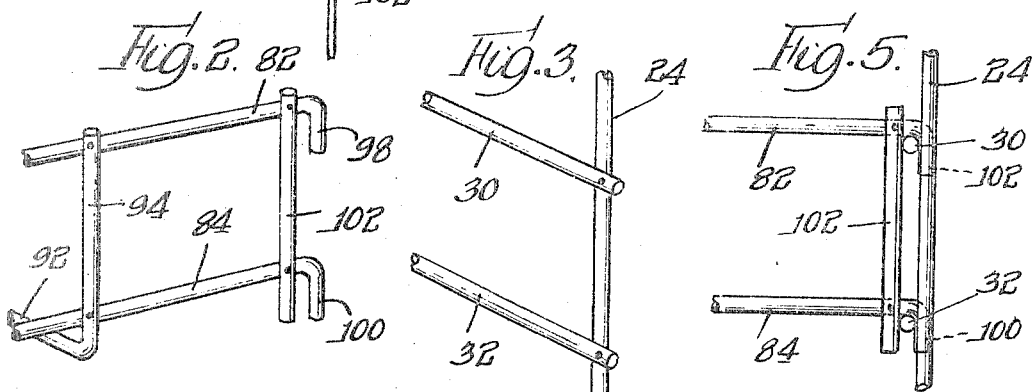
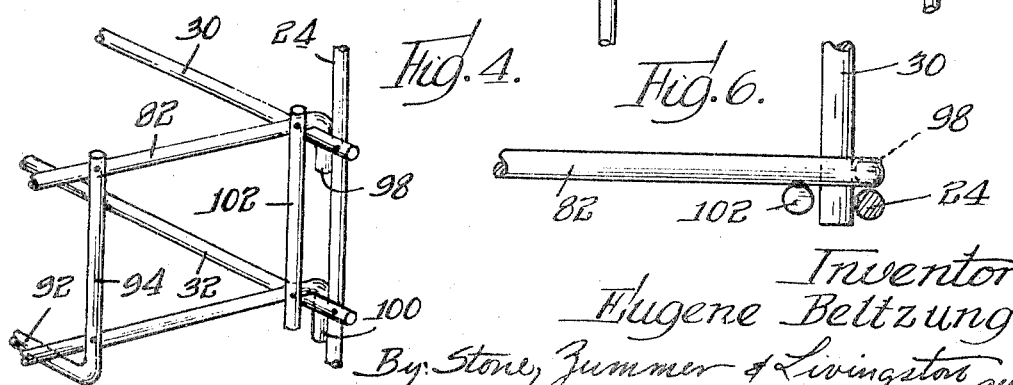
Inventor
Eugene Beltzung
By: Stone, Zimmer & Livingston attys United States Patent Office 3,487,951
Patented Jan. 6, 1970

3,487,951
DISPLAY STAND
Eugene Beltzung, Chicago, Ill., assignor to
Leon H. Trumpp, Northbrook, Ill.
Filed June 28, 1968, Ser. No. 741,132
Int. Cl. A47f 3/14
U.S. Cl. 211—133                        6 Claims

ABSTRACT OF THE DISCLOSURE

A display stand which may be readily assembled and is rigid. The stand includes a pair of sides, each of which has a pair of legs and a pair of parallel spaced cross bars fixed to each pair of legs. A tray is mounted between the sides and connects the sides. The tray has a pair of upper and lower edge stringers, each of which stringers has a hook formed on the end thereof and the hook is in engagement with a cross bar of the side. A spacer lock bar is fixed to each end of each pair of upper and lower edge stringers to space the stringers, and the spacer lock bar is in engagement with the respective cross bars to hold a cross bar snugly between the spacer lock bar and a respective hook.

BACKGROUND OF THE INVENTION

In merchandising many products, it is necessary to provide a light-weight rigid display stand which may be easily shipped in a knock-down condition, but which display stand may be readily assembled by a merchant, and the display stand has a high degree of rigidity when assembled. A popular construction of a display stand is what is known as a wire stand in that the stand is made up of a plurality of metal rods which are bent to a particular shape and welded to each other to form parts of a stand.

The optimum construction of a display stand sought after by a manufacturer is one in which the stand is inexpensive to manufacture, easy to assemble and still rigid when assembled. Ordinarily, one or more of these parameters must be sacrificed in the construction of a display stand. Customarily, display stands which are easy to assemble and inexpensive to manufacture are not rigid in that the stands tend to wobble. On the other hand, stands which have a high degree of rigidity are either expensive to manufacture or difficult to assemble. Display stands which are expensive to manufacture often include a number of precision made parts to provide an interconnection of these parts which provides a rigid display stand. It may be appreciated that if a display stand is held together with screws or bolts, a high degree of rigidity may be attained. However, the assembly of such a stand is difficult and the average merchant, who is the ultimate user of the stand, does not have the time, and in some instances, does not have the necessary skills to assemble such a display stand.

SUMMARY OF THE INVENTION

The present invention relates to an improved construction for a display stand in which the stand is made completely of metal rods, which metal rods are spot welded together. The general construction of the various parts is flat so that the display stand may be shipped with a minimum of space occupied by the display stand during shipment. The construction of the stand is such that the stand may be simply manufactured in that it is only necessary to cut the rods to length, make a few bends in the rods and form hooks in some of the rods, and the rods are then placed in a jig and spot welded together. Some parts are bent to form a tray, and the display stand is ready for packaging and shipment after an appropriate coating is applied.

The present display stand construction is such that a tray is formed in the stand and the construction of the tray is such that the tray is formed by elements of the stand which hold the various parts together in a rigid attitude. The tray of the present stand locks securely to the side portion of the display stand without the use of precision made parts, and there is no need to supply additional fastening means such as bolts or screws. It is a principal object of the present invention to provide a display stand, parts of which may be shipped substantially flat and the parts may be readily assembled into a rigid display stand.

It is another object of the present invention to provide a display stand construction wherein the display stand includes a tray construction which forms an integral part of the stand.

It is a still further object of this invention to provide a display stand which allows the display stand to be manufactured economically from metal rod.

Other objects and uses of the instant invention will become readily apparent to those skilled in the art upon a perusal of the following specification in light of the accompanying drawing.

BRIEF DESCRIPTION OF THE DRAWING

FIGURE 1 is a perspective view of a display stand embodying the herein-disclosed invention;

FIGURE 2 is an enlarged fragmentary view of a portion of a tray which constitutes a part of the display stand shown in FIGURE 1, showing a hook formed on one end of each of a pair of stringers and a spacer lock rod fixed to the stringers adjacent to the hooks;

FIGURE 3 is an enlarged fragmentary perspective view of a portion of a side of the display stand shown in FIGURE 1, showing a portion of a leg of the display stand and a portion of a pair of cross rods fixed to the leg;

FIGURE 4 is an enlarged fragmentary perspective view showing the tray portion of FIGURE 2 mounted in engagement with the side portion shown in FIGURE 3;

FIGURE 5 is an enlarged fragmentary side elevational view showing the interconnection of the parts shown in FIGURE 4; and FIGURE 6 is an enlarged fragmentary plan view of the interconnection of the parts shown in FIGURE 4.

DESCRIPTION OF THE PREFERRED EMBODIMENT

Referring now to the drawing and especially to FIGURE 1, a display stand, generally indicated by numeral 10 and embodying the herein-disclosed invention, is shown therein. The display stand 10 generally consists of a pair of sides 12 and 14 connected by a pair of identical trays 16 and 18 and a pair of identical shelves 20 and 22 extending between the sides 12 and 14. The construction of display stand 10 is such that all of the parts are made of welded steel rods, which in some instances, are appropriately bent, as will be described hereinafter.

The side 14 includes a front leg 24 and a rear leg 26, which legs are joined by a top bar 28 formed integral with the upper portions of legs 24 and 26. The side 14 also includes a pair of support cross bars 30 and 32, which bars are parallel to each other and have their ends spot welded to legs 24 and 26. A second pair of support bars 34 and 36 is mounted above the first pair of cross bars 30 and 32. An inclined support bar 38 also has its ends spot welded to legs 26 and 24, and a second inclined support bar 40 is also spot welded to legs 24 and 26. It may be seen that the side 14 may be easily and conveniently manufactured in that a long rod is bent in a generally U-shape to form the legs 24 and 26 and the top bar 28. The bent rod is placed in a jig in position with the support cross bars 30, 32, 34 and 36 and the inclined cross bars 38 and 40. The jig holds the parts in place, and the cross bars are then spot welded to the legs so that the side is completed quite readily and conveniently.

The side 12 is a mirror image of side 14 and includes a front leg 42 and a rear leg 48, which legs are joined by a top bar 46. The side 12 also includes a lower pair of support cross bars 48 and 50 and a pair of parallel upper support cross bars 52 and 54. A pair of inclined support bars 56 and 58 are fixed to the legs 42 and 44 in the same manner that support bars 38 and 40 are fixed to their respective legs.

Shelf 20 includes three parallel longitudinal rods 60, 62 and 64. The rods are connected by lateral rods 66, 68, 70, 72 and 74. The longitudinal rods 60 and 64 are spaced approximately the same distance as the space between the front legs 24 and 42 from the respective rear legs 26 and 44 along the inclined suport bars 40 and 58. The lateral rods 66 and 74 are spaced from each other a distance substantially equal to the distance between the sides 12 and 14. As may be seen in FIGURE 1, the longitudinal rods extend beyond the lateral rods 66 and 74. The extensions of rod 64 engage the legs 24 and 42 while the extensions of rod 60 engage legs 26 and 44. The rods 66 and 74 abut the inclined supports 58 and 40, respectively, so that the extensions of the longitudinal rods rest on the inclined support bars, thereby securely holding the shelf 20 in place since the longitudinal movement is prevented by the engagement of the lateral rods 66 and 74 with the inclined supports 58 and 40, respectively, and lateral movement is prohibited by engagement of the longitudinal rods with the respective legs.

The shelf 20, as may be appreciated, may be simply and economically manufactured by simply cutting the various rods to size, placing the rods in a jig, and spot welding the rods together at their intersections. The shelf 22 has the same construction as shelf 20 and is manufactured in the same manner.

Turning now to tray 18, it may be seen that the tray 18 has a forward edge 76, a rear edge 78 and a bottom 80. The forward edge 76 includes a forward upper edge stringer 82 and a forward lower edge stringer 84. The rear edge 78 includes an upper stringer 86 and a lower stringer 88. A plurality of lateral supports 90 connect the forward upper and lower edge stringers to each other and to the rear upper and lower edge stringers. Each of the lateral supports 90 includes a bottom portion 92 and a forward edge end 94, which is fixed to the forward upper end lower edge stringers 82 and 84, and a rear edge end 96 which is fixed to the rear upper and lower edge stringers 86 and 88.

Looking now to FIGURE 2, which shows the details of construction of an end portion of the forward edge 76, it may be seen that upper edge stringer 82 has a hook 98 formed in one end thereof. The lower edge stringer 84 has a hook 100 formed in the edge thereof. A spacer lock bar 102 is fixed to the stringers 82 and 84 adjacent to the hooks 98 and 100. The distance between the hook 98 and the spacer lock bar 102 is substantially equal to the diameter of cross bar 30. The distance between hook 100 and the spacer lock bar 102 is substantially equal to the diameter of cross bar 32. Inasmuch as the distance between the hooks and the spacer lock bars are substantially equal to the diameter of the cross bars 30 and 32, when the hooks are placed over the respective cross bars, the cross bars fit snugly between the hooks and the spacer lock bar.

As may be seen in FIGURE 1, the tray 18 has a pair of hooks in association with a spacer lock bar at each corner of the tray so that the cross bars may be held securely between the hooks and the spacer lock bars. When the tray 18 is connected to the cross bars 30 and 32 at one end and cross bars 48 and 50 at the other end, the upper cross bars 30 and 48 provide an end for the tray.

The tray 18 is simply manufactured in that the stringers are cut to length and hooks are formed on the ends of the stringers. The lateral supports are cut to length and the hooked stringers with the lateral supports are appropriately positioned in a jig. The spacer lock bars, which are also cut to length, are positioned in a jig with the stringers and the lateral supports. With all of the parts in position, the stringers are spot welded to the lateral supports and the spacer lock bars. After the spot welding is completed, the lateral supports are bent to form the edge ends, thereby forming the forward edge 76 and the rear edge 78. The tray 16 is identical in construction to the tray 18 and is manufactured in the same manner.

From the foregoing description, it may be seen that the sides, trays and shelves may be readily and conveniently manufactured utilizing a minimum of tools and using only jigs to hold the various elements of the parts in place for spot welding. After the parts have been made, the various parts may be plated or painted to improve their appearance. It may also be seen that the parts are relatively flat and may be quite readily shipped in a knock-down condition.

When the display stand is delivered to the ultimate user, and in many instances, a retail merchant, the user need only unpack the parts and place the tray 18 into engagement with the sides 12 and 14, as described above. Next the tray 16 is connected to the sides and the shelves 20 and 22 are placed into position. It may be seen that there is no need for special tools, or any tools, as a matter of fact, to assemble the instant display stand. The display stand is quite rigid in view of the fact that there is no opportunity for the stand to sway laterally. In the event that force is applied to side 12 to move it toward side 14, it may be seen that the hooks of trays 16 and 18 engage the cross bars 52, 54, 48 and 50 and the spacer lock rods engage the cross bars 34, 36, 30 and 32 so that there is no opportunity for the display stand to sway other than the sway which may occur as a result of the elastic deformation of the parts. From the foregoing description, it may be seen that the instant display stand may be easily and economically manufactured into a plurality of component parts which are relatively flat so that the display stand may be shipped in a generally flat knock-down condition. The display stand may be easily assembled with a minimum of instructions, and there is no need to use any tools for the assembly of the display stand.

Although a specific embodiment of the herein-disclosed display stand has been shown and described in detail above for purposes of illustration, it is to be expressly understood that the instant invention is limited only by the appended claims.

What is claimed is:

1. A display stand comprising, in combination, a pair of sides, each of said sides including a pair of legs and a pair of spaced cross bars, a tray positioned between said sides and removably connected to the sides holding the sides in an upright attitude, said tray including an upper edge stringer, a lower edge stringer, and a plurality of lateral supports connecting the stringers, each of the stringers having a hook formed on each end thereof and being engageable with a cross bar of the side, and a spacer lock bar fixed to the ends of each pair of stringers adjacent to the hooks, each of the spacer lock bars being positioned a distance from the adjacent hooks substantially equal to the width of the cross bar which is engaged by the hook to hold the cross bar snugly between the hook and the spacer lock bar, whereby the spacer lock bars hold the hooks in a spaced relationship for secure engagement with the respective cross bars.

2. A display stand as defined in claim 1, wherein the legs, cross bars, stringers and spacer lock bars are all solid rod material.

3. A display stand as defined in claim 1, wherein the cross bars of the sides are parallel to each other.

4. A display stand as defined in claim 1, wherein the tray includes a pair of upper edge stringers on opposite sides of the tray and a pair of lower edge stringers positioned on opposite sides of the tray, and each of the lateral supports includes edge ends which connect the upper and lower edge stringers, and the lateral supports extend from one side of the tray to the other.

5. A display stand as defined in claim 1, wherein the cross bars of the sides have their opposite ends spot welded to the legs of the sides and the spacer lock bar is spot welded to the stringers.

6. A display stand comprising, in combination, a pair of sides, each of said sides including a pair of vertical legs formed integral with a top bar connecting the legs, a pair of parallel cross bars having their ends fixed to the legs, a shelf cross bar having its ends fixed to the legs, a shelf having a plurality of longitudinal rods extending from the shelf cross bar of one side to the shelf cross bar of the other side and having a pair of outer longitudinal rods positioned between and in engagement with a pair of legs and a plurality of lateral rods fixed to and connecting the longitudinal rods, a pair of the outermost lateral rods in engagement with the shelf cross bars, a tray positioned between and connecting the sides, said tray including a pair of upper edge stringers having a hook at each end of the stringer engaging the upper cross bar of the respective side, a pair of lower edge stringers positioned below the upper edge stringers, each of said lower edge stringers having a hook engaging the respective lower cross support bar, a spacer lock bar fixed to each end of each pair of upper and lower edge stringers and being positioned adjacent to the respective hooks, said spacer lock bar being spaced a distance from the hook substantially equal to the width of the respective cross bar to hold snugly the cross bar between the hook and the spacer lock bar, and a plurality of lateral supports fixed to the upper and lower edge stringers to provide a bottom for the tray.

References Cited

UNITED STATES PATENTS

| | | | |
|---|---|---|---|
| 2,309,435 | 1/1943 | Bitney | 211—133 |
| 3,091,345 | 5/1963 | Hoose | 211—181 X |
| 3,101,148 | 8/1963 | Brown | 211—148 |
| 3,225,719 | 12/1965 | Marschak | 211—181 X |
| 3,252,434 | 5/1966 | Young | 211—181 X |
| 3,280,989 | 10/1966 | Melvin | 211—133 |
| 3,387,855 | 6/1968 | Oliver | 211—133 X |
| 3,435,958 | 4/1969 | Chesley | 211—133 |

NILE C. BYERS, JR., Primary Examiner

U.S. Cl. X.R.

211—181